US012609417B2

(12) United States Patent
Abe et al.

(10) Patent No.: US 12,609,417 B2
(45) Date of Patent: Apr. 21, 2026

(54) BATTERY MODULE

(71) Applicant: PRIME PLANET ENERGY & SOLUTIONS, INC., Tokyo (JP)

(72) Inventors: Kosyo Abe, Himeji (JP); Takahide Takeda, Himeji (JP); Keiichiro Kobayashi, Nisshin (JP); Yasushi Tsuchida, Nisshin (JP); Yuzo Suzuki, Kariya (JP); Masaki Koike, Nagoya (JP); Koji Watanabe, Okazaki (JP); Seiichi Sakuramoto, Kobe (JP); Makoto Ochi, Myouzai-gun (JP); Kosuke Iwase, Konan (JP); Mio Takeno, Miki (JP); Yasuo Ikeda, Toyota (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 672 days.

(21) Appl. No.: 18/051,234

(22) Filed: Oct. 31, 2022

(65) Prior Publication Data

US 2023/0155254 A1     May 18, 2023

(30) Foreign Application Priority Data

Nov. 17, 2021     (JP) ................................. 2021-187141

(51) Int. Cl.
*H01M 50/503*     (2021.01)
*H01M 50/264*     (2021.01)
*H01M 50/507*     (2021.01)

(52) U.S. Cl.
CPC ....... *H01M 50/503* (2021.01); *H01M 50/264* (2021.01); *H01M 50/507* (2021.01); *H01M 2220/20* (2013.01)

(58) Field of Classification Search
CPC ............. H01M 50/503; H01M 50/264; H01M 50/507; H01M 2220/20; H01M 50/514;
(Continued)

(56) References Cited

U.S. PATENT DOCUMENTS

2015/0140391 A1     5/2015     Sakate et al.
2016/0181604 A1*     6/2016     Son ..................... H01M 10/425
429/90

(Continued)

FOREIGN PATENT DOCUMENTS

CN     105047498 A     11/2015
CN     107004832 A     8/2017
(Continued)

OTHER PUBLICATIONS

Kazunori, JP 2016-115458A; Espacenet machine translation, 2016 (Year: 2016).*

*Primary Examiner* — Adam A Arciero
(74) *Attorney, Agent, or Firm* — Finnegan, Henderson, Farabow, Garrett, and Dunner, LLP

(57)     ABSTRACT

A battery module includes: a plurality of battery cells stacked in a predetermined direction; and a plurality of bus bars that electrically connect the plurality of battery cells together. The plurality of bus bars include a first bus bar extending between a first battery cell and a second battery cell of the plurality of battery cells, the first battery cell and the second battery cell being adjacent to each other in the predetermined direction. The first bus bar has a first base portion connected to the first battery cell, a second base portion connected to the second battery cell, and a rising portion that has a shape to rise from the first base portion and the second base portion and that connects between the first base portion and the second base portion. A fragile portion is provided in a root region of the rising portion.

7 Claims, 9 Drawing Sheets

(58) Field of Classification Search

CPC ............. H01M 50/516; H01M 50/574; H01M 50/209; Y02E 60/10

See application file for complete search history.

(56) References Cited

U.S. PATENT DOCUMENTS

| | | |
|---|---|---|
| 2018/0151862 A1 | 5/2018 | Bessho et al. |
| 2020/0076022 A1 | 3/2020 | Kawakami et al. |
| 2020/0321589 A1 | 10/2020 | Watahiki et al. |
| 2021/0203040 A1 | 7/2021 | Okada et al. |
| 2022/0021093 A1 | 1/2022 | Chen et al. |

FOREIGN PATENT DOCUMENTS

| | | |
|---|---|---|
| CN | 107851767 A | 3/2018 |
| CN | 108604659 A | 9/2018 |
| CN | 111164795 A | 5/2020 |
| EP | 3694024 A1 | 8/2020 |
| JP | 2011-253735 A | 12/2011 |
| JP | 2012-059451 A | 3/2012 |
| JP | 2016-115458 A | 6/2016 |
| JP | 2017-216095 A | 12/2017 |
| WO | WO 2018/221004 A1 | 12/2018 |
| WO | WO 2019/069837 A1 | 4/2019 |
| WO | WO 2021/196730 A1 | 10/2021 |

* cited by examiner

BATTERY MODULE

This nonprovisional application is based on Japanese Patent Application No. 2021-187141 filed on Nov. 17, 2021, with the Japan Patent Office, the entire contents of which are hereby incorporated by reference.

BACKGROUND OF THE INVENTION

Field of the Invention

The present invention relates to a battery module.

Description of the Background Art

For example, Japanese Patent Laying-Open No. 2017-216095 discloses a battery module including: a battery cell stack formed by stacking a plurality of battery cells; and a plurality of bus bars that each connect between positive electrode external terminal and negative electrode external terminal of battery cells adjacent to each other in the stacking direction. Each of the bus bars is provided with a fragile portion, which is a portion weak in compressive strength in the stacking direction of the battery cells.

Japanese Patent Laying-Open No. 2012-59451 discloses a bus bar module including: a plurality of bus bars that each electrically connects between adjacent power storage elements; a plurality of bus bar holding portions that hold the plurality of bus bars; and a coupling portion that couples adjacent bus bar holding portions to each other. The coupling portion is provided with a notch such that the cross sectional area of a predetermined portion thereof is smaller than that of a portion adjacent to the predetermined portion.

Japanese Patent Laying-Open No. 2011-253735 discloses an battery pack including: a plurality of unit cells each having a gas-discharge valve and stacked in a predetermined direction; and a bus bar module into which a plurality of bus bars that connect between unit cells adjacent to each other in the predetermined direction are unitized. The bus bar module is provided with a fragile portion, which is melted by heat when gas is discharged from the gas-discharge valve.

SUMMARY OF THE INVENTION

As disclosed in each of the pieces of the patent literature described above, there has been known a battery module including a plurality of battery cells stacked in one direction, wherein a bus bar is used as means for electrically connecting the plurality of battery cells together.

On the other hand, in some situations such as maintenance of the battery module, one may wish to disassemble the battery module by disconnecting a plurality of battery cells connected by a bus bar. However, in the conventional battery module, the disassembling of the battery module is not sufficiently taken into consideration in terms of connection made between the plurality of battery cells by the bus bar.

In view of the above, it is an object of the present invention to solve the above-described problem and provide a battery module allowing for excellent workability at the time of disassembling.

A battery module according to the present invention includes: a plurality of battery cells stacked in a predetermined direction; and a plurality of bus bars that electrically connect the plurality of battery cells together. The plurality of bus bars includes a first bus bar extending between a first battery cell and a second battery cell of the plurality of battery cells, the first battery cell and the second battery cell being adjacent to each other in the predetermined direction. The first bus bar has a first base portion connected to the first battery cell, a second base portion connected to the second battery cell, and a rising portion that has a shape to rise from the first base portion and the second base portion and that connects between the first base portion and the second base portion. A fragile portion is provided in a root region of the rising portion.

According to the battery module thus configured, by breaking the fragile portion, an operator can disconnect the connection made between the first base portion and the second base portion by the rising portion, thereby separating the first battery cell and the second battery cell. In this case, since the fragile portion is provided in the root region of the rising portion, the operator can readily break the fragile portion. Thus, workability at the time of disassembling the battery module can be improved.

Preferably, the fragile portion has a thin structure in which a thickness of the rising portion is locally small.

According to the battery module thus configured, the operator can readily break the fragile portion having such a thin structure.

Preferably, restraint force along the predetermined direction is applied to the plurality of battery cells. A thickness direction of the rising portion at the fragile portion is parallel to the predetermined direction.

According to the battery module thus configured, when the operator applies, to the rising portion, force in the thickness direction of the rising portion in order to break the fragile portion having the thin structure, the direction in which the force is applied is parallel to the direction in which the restraint force is applied to the plurality of battery cells. Therefore, the restraining force serves to suppress the postures of the first battery cell and the second battery cell from leaning in the direction of the force applied to the rising portion, with the result that the force can be more efficiently transmitted to the fragile portion. Thus, the operator can break the fragile portion more readily.

Preferably, the fragile portion is constituted of a notched structure or a perforated structure, the notched structure being a structure in which a notch is provided in a width direction of the rising portion, the width direction of the rising portion being orthogonal to a rising direction of the rising portion and a thickness direction of the rising portion, the perforated structure being a structure in which cut portions each extending through the rising portion in the thickness direction of the rising portion are intermittently provided in a form of a line.

According to the battery module thus configured, the operator can readily break the fragile portion constituted of the notched structure or the perforated structure.

Preferably, the fragile portion is provided to overlap with a predetermined plane that constitutes a boundary between the first battery cell and the second battery cell. The first bus bar has a symmetrical shape with respect to the predetermined plane.

According to the battery module thus configured, the first has bar is supported in a balanced manner by the first battery cell and the second battery cell on both sides beside the fragile portion. Therefore, when the operator applies force to the rising portion in order to break the fragile portion, the first bus bar is suppressed from being deformed, with the result that the force can be more efficiently transmitted to the fragile portion. Thus, the operator can break the fragile portion more readily.

Preferably, the rising portion and includes a dividable portion that connects between the first base portion and the second base portion and that is dividable from the first base portion and the second base portion with the fragile portion serving as a boundary.

According to the battery module thus configured, the operator can efficiently apply force to the rising portion while holding the dividable portion until the fragile portion becomes broken. Thus, the operator can break the fragile portion more readily.

Preferably, the rising portion further includes a first remaining portion and a second remaining portion, the first remaining portion remaining on the first base portion side in a state in which the dividable portion is divided from the first base portion and the second base portion, the second remaining portion remaining on the second base portion side and being placed on the first remaining portion in the state in which the dividable portion is divided from the first base portion and the second base portion.

According to the battery module thus configured, after disconnecting the connection made between the first base portion and the second base portion by the rising portion so as to separate the first battery cell and the second battery cell, the disassembled battery module may be assembled again. Even in such a case, the first base portion and the second base portion can be connected to each other by using the first remaining portion and the second remaining portion that are placed on each other.

Preferably, the battery module includes a plurality of battery cell units arranged side by side in the predetermined direction and fed with restraining force along the predetermined direction. Each of the battery cell units has the plurality of battery cells arranged side by side continuously in the predetermined direction, and a holding member that collectively holds the plurality of battery cells arranged side by side continuously in the predetermined direction. The first bus bar electrically connects between battery cells adjacent to each other in the predetermined direction between a first battery cell unit of the plurality of battery cell units and a second battery cell unit of the plurality of battery cell units, the second battery cell unit being adjacent to the first battery cell unit in the predetermined direction. The plurality of bus bars further include a second bus bar that electrically connects between battery cells adjacent to each other in the predetermined direction in each of the battery cell units.

According to the battery module thus configured, the first battery cell unit and the second battery cell unit can be separated by a simple operation.

Preferably, each of the battery cells has an output density of 8000 W/L or more.

According to the battery module thus configured, workability at the time of disassembling can be improved in the battery module including the battery cells each having a high output density of 8000 W/L or more.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
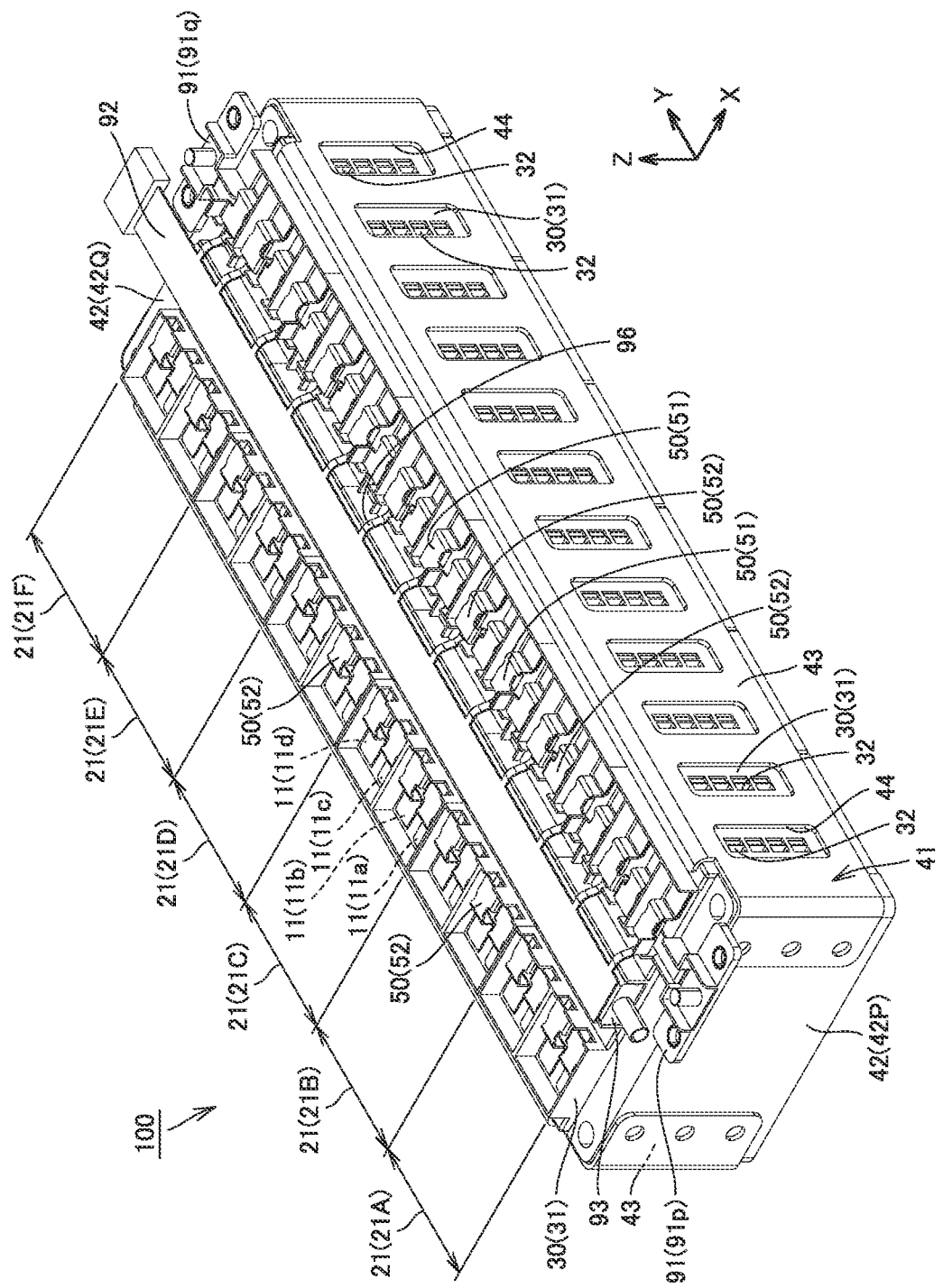
FIG. 1 is a perspective view showing a battery module according to an embodiment of the present invention.

Embodiments of the present invention will be described with reference to figures. It should be noted that in the figures referred to below, the same or corresponding members are denoted by the same reference characters.

Figure 2:
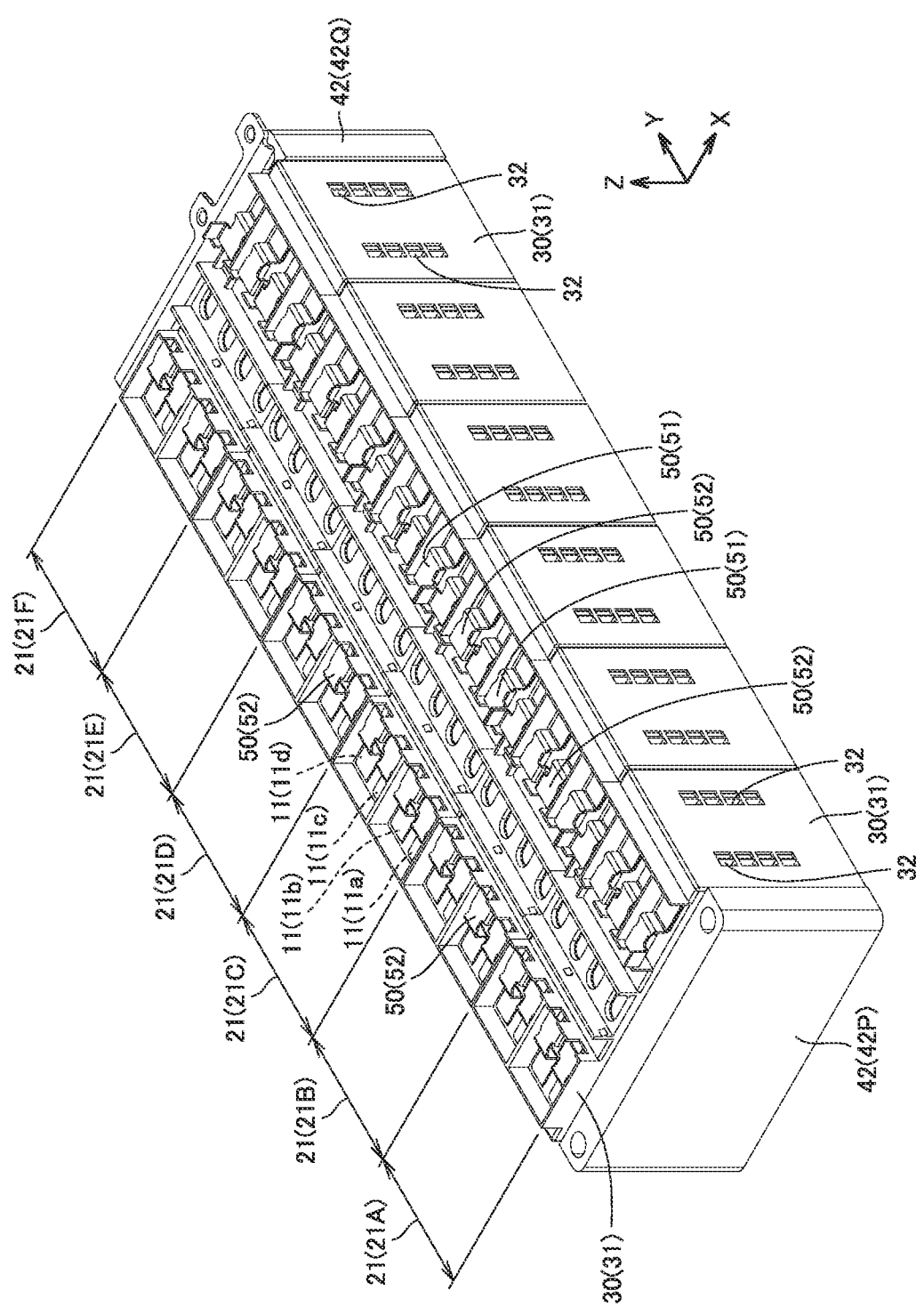
FIG. 2 is a perspective view showing an internal structure of the battery module in FIG. 1.
Figure 3:
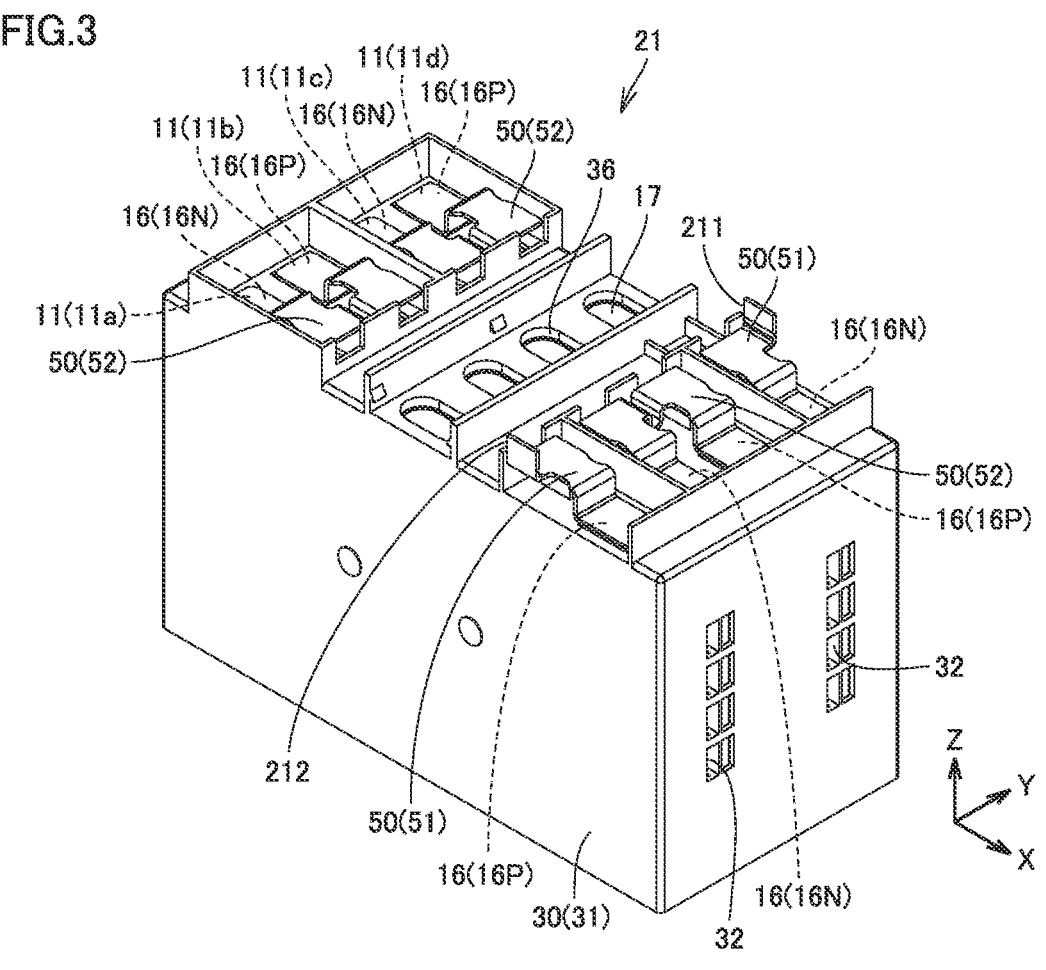
FIG. 3 is a perspective view showing a battery cell unit included in the battery module in FIG. 1.

FIG. 1 is a perspective view showing a battery module according to an embodiment of the present invention. FIG. 2 is a perspective view showing an internal structure of the battery module in FIG. 1. FIG. 3 is a perspective view showing a battery cell unit included in the battery module in FIG. 1.

Referring to FIGS. 1 to 3, a battery module 100 is used as a power supply for driving a vehicle such as a hybrid electric vehicle (HEV), a plug-in hybrid electric vehicle (PHEV), or a battery electric vehicle (BEV).

In the present specification, for convenience of description of the structure of battery module 100, the "Y axis" represents an axis extending in parallel with a stacking direction of a plurality of below-described battery cells 11, the "X axis" represents an axis extending in a direction orthogonal to the Y axis, and the "Z axis" represents an axis extending in a direction orthogonal to the Y axis and the X axis. An obliquely rightward upward direction in the plane of sheet of FIG. 1 is "+Y axis direction", and an obliquely leftward downward direction in the plane of sheet of FIG. 1 is "−Y axis direction". An obliquely rightward downward direction in the plane of sheet of FIG. 1 is "+X axis direction" and an obliquely leftward upward direction in the plane of sheet of FIG. 1 is "−X axis direction". An upward direction in the plane of sheet of FIG. 1 is "+Z axis direction" and a downward direction in the plane of sheet of FIG. 1 is "−Z axis direction".

Typically, battery module 100 is mounted on a vehicle in such a posture that the +Z axis direction corresponds to the upward direction and the −Z axis direction corresponds to the downward direction.

First, an overall structure of battery module 100 will be described. As shown in FIG. 1, battery module 100 includes a plurality of battery cell units 21 (21A, 21B, 21C, 21D, 21E, 21F) and a restraint member 41.

The plurality of battery cell units 21 are stacked in the Y axis direction. Battery cell unit 21A, battery cell unit 21B, battery cell unit 21C, battery cell unit 21D, battery cell unit 21E, and battery cell unit 21F are arranged side by side in this order from the negative side to the positive side in the Y axis direction. It should be noted that the number of battery cell units 21 included in battery module 100 is not particularly limited as long as two or inure battery cell units 21 are included.

The plurality of battery cell units 21 are collectively held by restraint member 41. Restraint member 41 applies, to the plurality of battery cell units 21, restraint force along the Y axis direction. Restraint member 41 has a pair of end plates 42 (42P, 42Q), a pair of first restraint bands 43, and a second restraint band (not shown).

The pair of end plates 42 are disposed on both sides beside the plurality of battery cell units 21 stacked in the Y axis direction. End plate 42P is disposed to face battery cell unit 21A in the Y axis direction. End plate 42Q is disposed to face battery cell unit 21F in the Y axis direction. Each of end plates 42 is composed of a plate material having a thickness direction corresponding to the Y axis direction.

The pair of first restraint bands 43 are disposed on both sides beside the plurality of battery cell units 21 in the X axis direction. The second restraint band (not shown) is provided at a position facing the plurality of battery cell units 21 in the Z axis direction. Each of first restraint bands 43 and the second restraint band extends in the Y axis direction. An end portion of each of first restraint hands 43 and the second restraint band in the −Y axis direction is connected to end plate 42P. An end portion of each of first restraint bands 43 and the second restraint band in the +Y axis direction is connected to end plate 42Q.

Each of first restraint bands 43 is provided with a plurality of openings 44. The plurality of openings 44 are provided at intervals in the Y axis direction, and each of openings 44 is constituted of a through hole extending through first restraint band 43 in the X axis direction. Opening 44 is provided to expose ventilation ports 32 provided in a case body 31 described later.

Battery module 100 further has a pair of collective terminals 91 (91p, 91q), a wiring member 92, a plurality of voltage detection wires 96, and an exhaust duct 93.

The pair of collective terminals 91 are disposed on both sides beside the plurality of battery cell units 21 stacked in the Y axis direction. Collective terminal 91p is provided at a position overlapping with end plate 42P when viewed in the Z axis direction. Collective terminal 91q is provided at a position overlapping with end plate 42Q when viewed in the Z axis direction. Each of collective terminals 91 is a terminal for connecting battery module 100 to an external wiring such as a cable disposed outside battery module 100.

Wiring member 92 is provided at a position facing the plurality of battery cell units 21 in the Z axis direction. Wiring member 92 is disposed opposite to the second restraint band (not shown) with the plurality of battery cell units 21 being interposed therebetween. Wiring member 92 extends, in the Y axis direction, through the central portions of battery cell units 21 in the X axis direction. Wiring member 92 is composed of, for example, a flexible printed circuit board. The plurality of voltage detection wires 96 extend from wiring member 92 and are respectively connected to a plurality of below-described bus bars 50.

Exhaust duct 93 extends in the Y axis direction. Exhaust duct 93 extends at a position overlapping with wiring member 92 when viewed in the Z axis direction. Exhaust duct 93 is disposed between each of the plurality of battery cell units 21 and wiring member 92 in the Z axis direction.

As shown in FIGS. 2 and 3, each of battery cell units 21 has a plurality of battery cells 11 and a holding member 30.

Battery cell unit 21 has four battery cells 11 (11a, 11b, 11c, 11d). Battery cell unit 21 has an even number of battery cells 11. It should be noted that the number of battery cells 11 included in each battery cell unit 21 is not particularly limited as long as two or more battery cells 11 are included. An odd number of battery cells 11 may be included.

In each battery cell unit 21, i.e., in each of battery cell unit 21A, battery cell unit 21B, battery cell unit 21C, battery cell unit 21D, battery cell unit 21E, and battery cell unit 21F, the plurality of battery cells 11 are arranged side by side continuously in the Y axis direction. Battery cell 11a, battery cell 11b, battery cell 11c, and battery cell 11d are arranged side by side in this order from the negative side to the positive side in the Y axis direction.

The stacking direction of the plurality of battery cells 11 in each battery cell unit 21 is the same as the stacking direction of the plurality of battery cell units 21. Restraint member 41 applies, to the plurality of battery cells 11, restraint force along the Y axis direction.

Holding member 30 collectively holds the plurality of battery cells 11 (11a, 11b, 11c, 11d). Holding member 30 includes case body 31. Case body 31 has an external appearance having a rectangular parallelepiped shape. The plurality of battery cells 11 are accommodated in case body 31.

Case body 31 is provided with the plurality of ventilation ports 32. The plurality of ventilation ports 32 are provided in the both side surfaces of case body 31 orthogonal to the X axis direction. Each of ventilation ports 32 is constituted of a through hole extending through case body 31 in the X axis direction. Ventilation port 32 is provided as a path for introducing cooling air into a space between battery cells 11 adjacent to each other in the Y axis direction and discharging the cooling air from the space.

Figure 4:
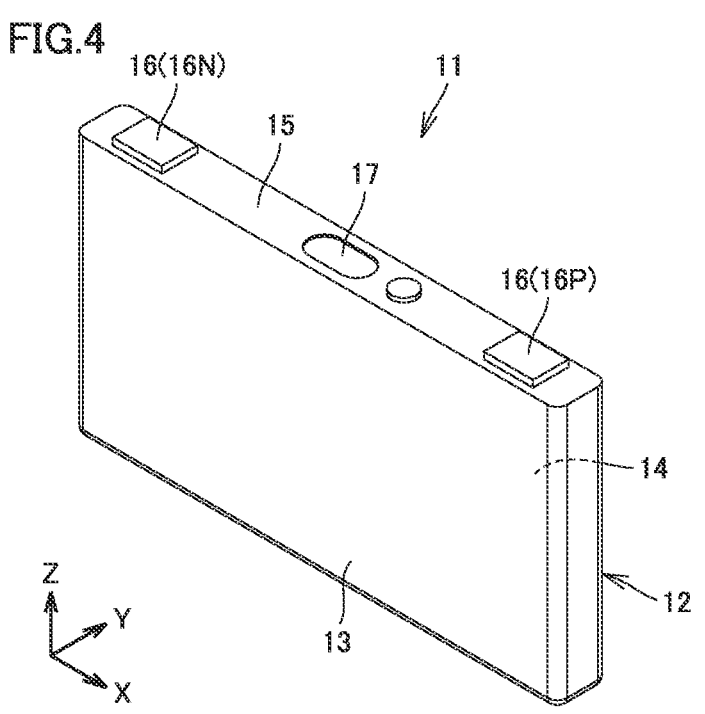
FIG. 4 is a perspective view showing a battery cell included in the battery cell unit in FIG. 3.
Figure 5:
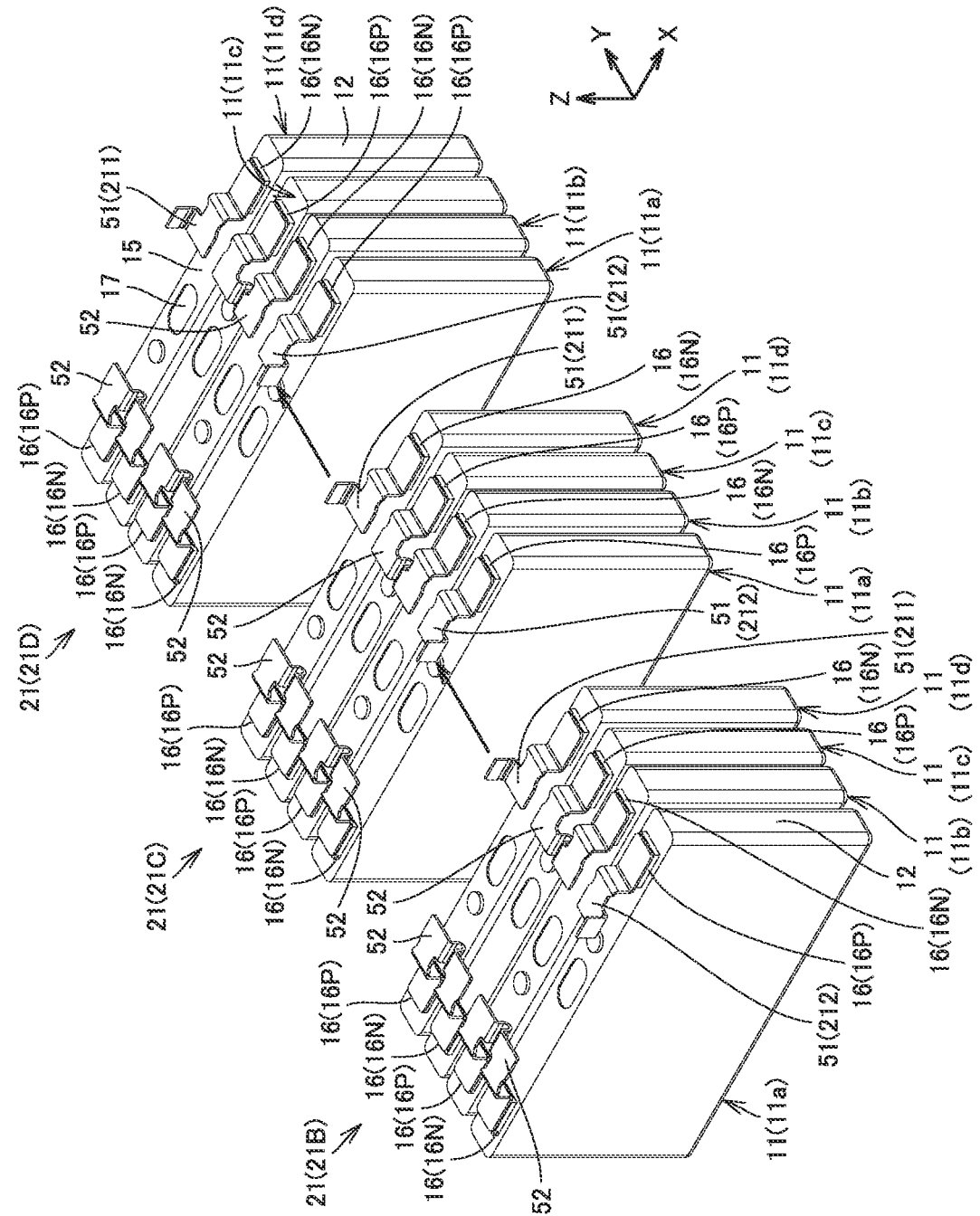
FIG. 5 is an exploded assembly diagram showing a connection structure for a plurality of battery cells.

FIG. 4 is a perspective view showing a battery cell included in the battery cell unit in FIG. 3. FIG. 5 is an exploded assembly diagram showing a connection structure for a plurality of battery cells.

Referring to FIGS. 4 and 5, battery cell 11 is a lithium ion battery. Battery cell 11 has an output density of 8000 W/L or more. Battery cell 11 has a prismatic shape and has a thin plate shape in the form of a rectangular parallelepiped. The plurality of battery cells 11 are stacked such that the Y axis direction corresponds to the thickness direction of each battery cell 11.

Each of battery cells 11 has an exterior package 12. Exterior package 12 is constituted of a housing having a rectangular parallelepiped shape, and forms the external appearance of battery cell 11. An electrode assembly and an electrolyte solution are accommodated in exterior package 12.

Exterior package 12 has a first side surface 13, a second side surface 14, and a third side surface 15. Each of first side surface 13 and second side surface 14 is constituted of a flat surface orthogonal to the Y axis direction. First side surface 13 and second side surface 14 are oriented oppositely in the Y axis direction. Each of first side surface 13 and second side surface 14 has the largest area among the areas of the plurality of side surfaces of exterior package 12. Each of first side surface 13 and second side surface 14 has a rectangular shape when viewed in the Y axis direction. Each of first side surface 13 and second side surface 14 has a rectangular shape in which the X axis direction corresponds to the long-side direction and the Z axis direction corresponds to the short-side direction when viewed in the Y axis direction. Third side surface 15 is constituted of a flat surface orthogonal to the Z axis direction. Third side surface 15 is oriented in the +Z axis direction.

Battery cell 11 further includes a gas-discharge valve 17. Gas-discharge valve 17 is provided in third side surface 15. When internal pressure of exterior package 12 becomes more than or equal to a predetermined value due to gas generated inside exterior package 12, gas-discharge valve 17 discharges the gas to the outside of exterior package 12. The gas from gas-discharge valve 17 flows through exhaust duct 93 in FIG. 1 and is discharged to the outside of battery module 100.

Battery cell 11 further has electrode terminals 16 including a pair of a positive electrode terminal 16P and a negative electrode terminal 16N. Each of electrode terminals 16 is composed of a metal. Electrode terminal 16 is provided on third side surface 15. Positive electrode terminal 16P and negative electrode terminal 16N are provided to be separated from each other in the X axis direction. Positive electrode terminal 16P and negative electrode terminal 16N are provided beside wiring member 92 and exhaust duct 93 in the X axis direction.

The plurality of battery cells 11 are stacked such that first side surfaces 13 of battery cells 11, 11 adjacent to each other in the Y axis direction face each other and second side surfaces 14 of battery cells 11, 11 adjacent to each other in the Y axis direction face each other. Thus, positive electrode terminals 16P and negative electrode terminals 16N are alternately arranged in the Y axis direction in which the plurality of battery cells 11 are stacked.

It should be noted that when an odd number of battery cells 11 are included in battery cell unit 21, the posture of battery cell unit 21 may be turned by 180° with respect to the Z axis between battery cell units 21 adjacent to each other in the Y axis direction.

Next, a connection structure for the plurality of battery cells 11 will be described. Referring to FIGS. 1 to 5, battery module 100 further has the plurality of bus bars 50. Each of bus bars 50 is composed of an electric conductor. The plurality of bus bars 50 are provided to electrically connect the plurality of battery cells 11 of battery module 100 together.

Each of bus bars 50 extends in the Y axis direction. Bus bar 50 has ends that both extend in the Y axis direction and that are connected to battery cells 11, 11 adjacent to each other in the Y axis direction. Bus bar 50 is provided between battery cells 11, 11 adjacent to each other in the Y axis direction so as to connect positive electrode terminal 16P and negative electrode terminal 16N arranged side by side in the Y axis direction. The plurality of battery cells 11 are electrically connected together in series by the plurality of bus bars 50.

Figure 6:
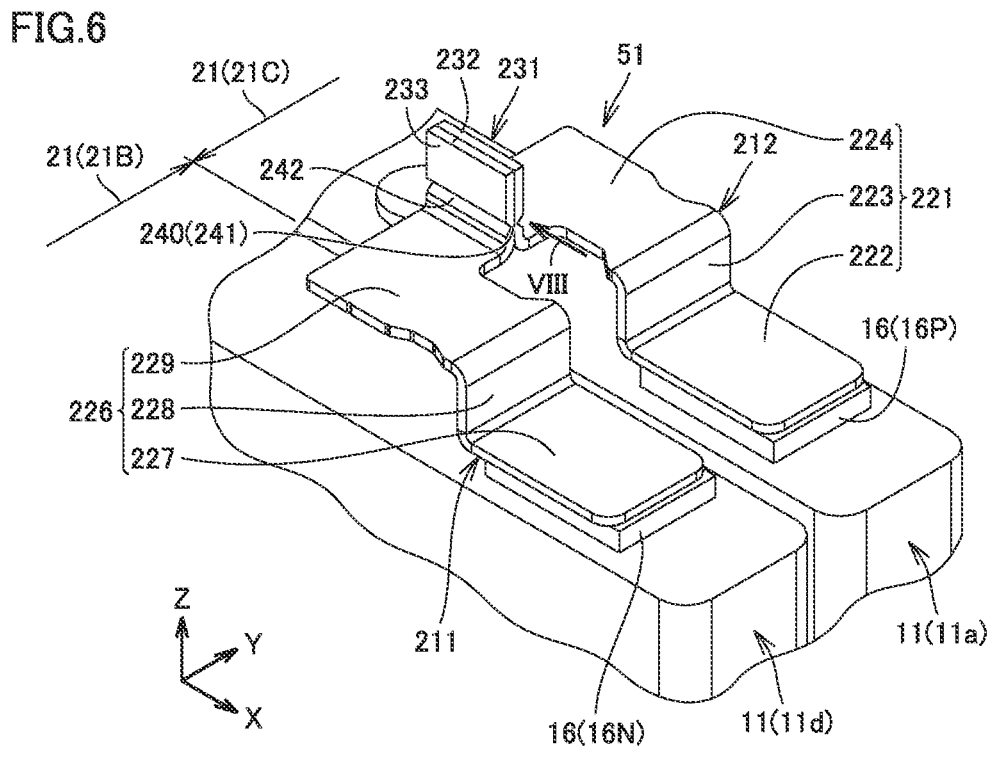
FIG. 6 is a perspective view showing a connection structure for battery cells between adjacent battery cell units.
Figure 7:
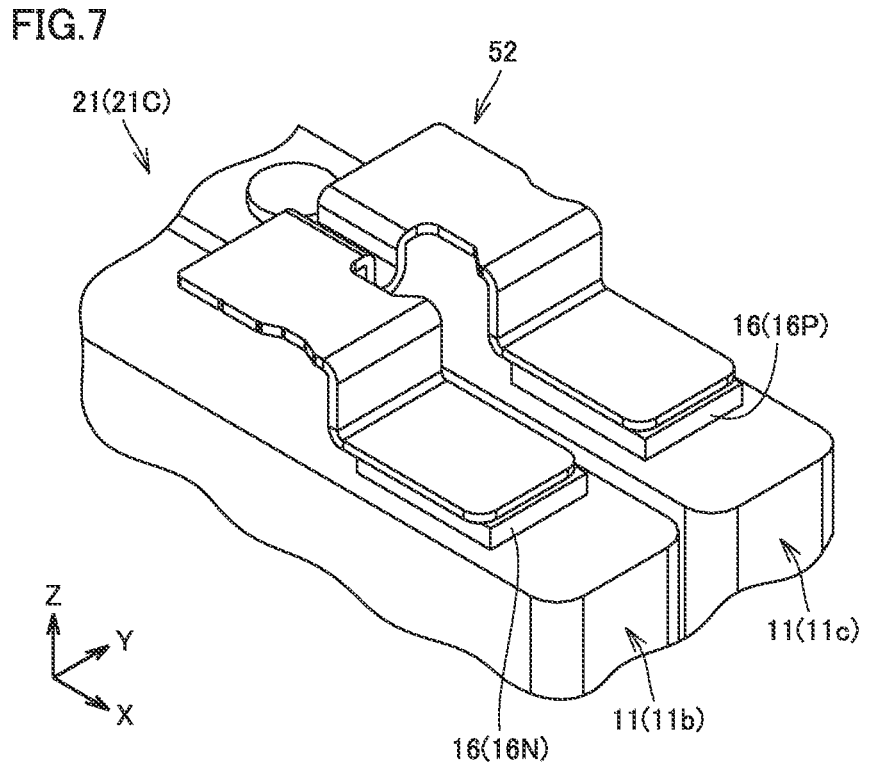
FIG. 7 is a perspective view showing a connection structure for battery cells in a battery cell unit.

FIG. 6 is a perspective view showing a connection structure for battery cells between adjacent battery cell units. FIG. 7 is a perspective view showing a connection structure for battery cells in a battery cell unit.

Referring to FIGS. 5 to 7, the plurality of bus bars 50 include one or more first bus bars 51 and one or more second bus bars 52. In the present embodiment, the plurality of bus bars 50 include a plurality of first bus bars 51 and a plurality of second bus bars 52.

As shown in FIGS. 5 and 6, each of first bus bars 51 extends between first battery cell 11d and second battery cell 11a of the plurality of battery cells 11, first battery cell 11d and second battery cell 11a being adjacent to each other in the Y axis direction. First bus bar 51 electrically connects between battery cells 11, 11 adjacent to each other in the Y axis direction between a first battery cell unit of the plurality of battery cell units 21 and a second battery cell unit of the plurality of battery cell units 21, the second battery cell unit being adjacent to the first battery cell unit in the Y axis direction.

First bus bar 51 has a first base portion 226, a second base portion 221, and a rising portion 231. First base portion 226 is connected to first battery cell 11d. Second base portion 221 is connected to second battery cell 11a. Rising portion 231 has a shape to rise from first base portion 226 and second base portion 221. Rising portion 231 connects between first base portion 226 and second base portion 221.

For explanation in the range shown in FIG. 6, battery cell unit 21B corresponds to the first battery cell unit, battery cell unit 21C corresponds to the second battery cell unit, battery cell 11d in battery cell unit 21B corresponds to the first battery cell, and battery cell 11a in battery cell unit 21C corresponds to the second battery cell.

First base portion 226 is connected to negative electrode terminal 16N of battery cell lid in battery cell unit 21B. Second base portion 221 is connected to positive electrode terminal 16P of battery cell 11a in battery cell unit 21C. Between battery cell units 21B, 21C, first bus bar 51 electrically connects negative electrode terminal 16N of battery cell 11d in battery cell unit 21B to positive electrode terminal 16P of battery cell 11a in battery cell unit 21C.

As shown in FIGS. 5 and 7, in each battery cell unit 21, second bus bar 52 electrically connects between battery cells 11, 11 adjacent to each other in the Y axis direction. For explanation in a range shown in FIG. 7, second bus bar 52 electrically connects negative electrode terminal 16N of battery cell 11b to positive electrode terminal 16P of battery cell 11c in battery cell unit 21C.

Figure 8:
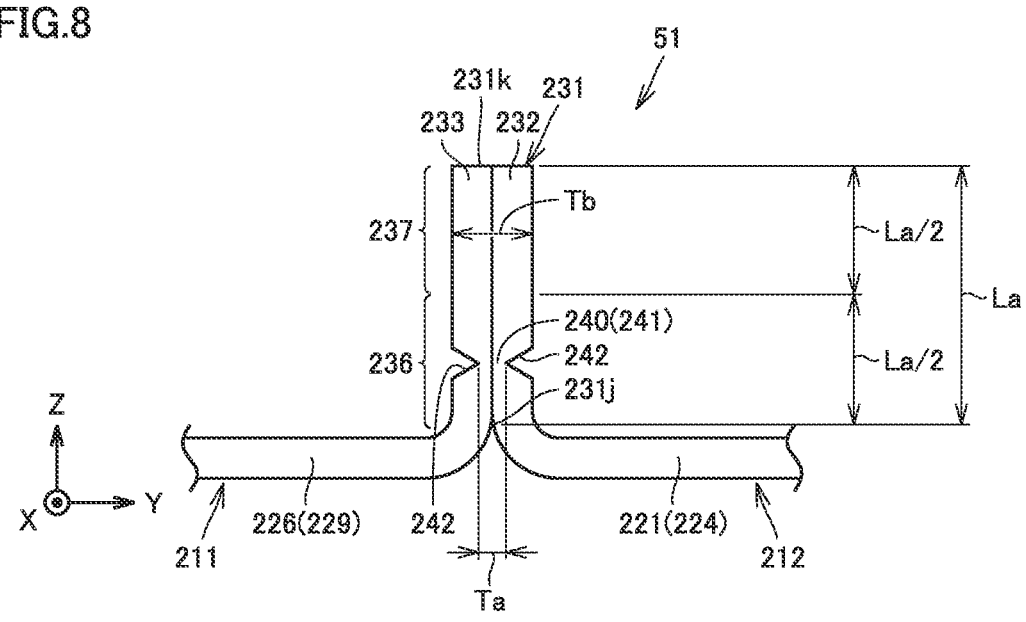
FIG. 8 is a diagram showing the connection structure for the battery cells when viewed in a direction indicated by an arrow VIII in FIG. 6.

FIG. 8 is a diagram showing the connection structure for the battery cells when viewed in a direction indicated by an arrow VIII in FIG. 6. The following describes a more specific structure of first bus bar 51 while focusing on the ranges shown in FIGS. 6 and 8.

Referring to FIGS. 6 and 8, first bus bar 51 is formed by combining a first bus-bar-divided body 211 and a second bus-bar-divided body 212.

First bus-bar-divided body 211 and second bus-bar-divided body 212 are composed of electric conductors (metal plates) separated from each other. First bus-bar-divided body 211 is connected to negative electrode terminal 16N of battery cell 11d in battery cell unit 21B. Second bus-bar-divided body 212 is connected to positive electrode terminal 16P of battery cell 11a in battery cell unit 21C. First bus-bar-divided body 211 and second bus-bar-divided body 212 are joined to each other by welding.

First bus-bar-divided body 211 is provided at a position overlapping with battery cell 11d in battery cell unit 21B when viewed in the Z axis direction. First bus-bar-divided body 211 has a first plate portion 227, a second plate portion 228, a third plate portion 229, and a fourth plate portion 233.

First plate portion 227 has a plate shape having a thickness direction corresponding to the Z axis direction, and is disposed in parallel with an X-Y-axes plane. First plate portion 227 is placed on negative electrode terminal 16N of battery cell 11d in battery cell unit 21B in the Z axis direction. First plate portion 227 is joined to negative electrode terminal 16N of battery cell 11d in battery cell unit 21B by welding. Second plate portion 228 has a plate shape having a thickness direction corresponding to the X axis direction, and is disposed in parallel with a Y-Z-axes plane. Second plate portion 228 extends in the +Z axis direction from the end portion of first plate portion 227 in the –X axis direction.

Third plate portion 229 has a plate shape having a thickness direction corresponding to the Z axis direction, and is disposed in parallel with the X-Y-axes plane. Third plate portion 229 extends in the –X axis direction from the end portion of second plate portion 228 in the +Z axis direction. Fourth plate portion 233 has a plate shape having a thickness direction corresponding to the Y axis direction, and is disposed in parallel with the X-Z-axes plane. Fourth plate portion 233 extends in the +Z axis direction from the end portion of third plate portion 229 in the +Y axis direction.

Second bus-bar-divided body 212 is provided at a position overlapping with battery cell 11a in battery cell unit 21C when viewed in the Z axis direction. Second bus-bar-divided body 212 has a fifth plate portion 222, a sixth plate portion 223, a seventh plate portion 224, and an eighth plate portion 232.

Fifth plate portion 222, sixth plate portion 223, seventh plate portion 224, and eighth plate portion 232 respectively have shapes symmetrical to first plate portion 227, second plate portion 228, third plate portion 229, and fourth plate portion 233 with respect to the X-Z-axes plane that constitutes a boundary between battery cell 11d in battery cell unit 21B and battery cell 11a in battery cell unit 21C.

Fifth plate portion 222 is placed on positive electrode terminal 16P of battery cell 11a in battery cell unit 21C in the Z axis direction. Fifth plate portion 222 is joined to positive electrode terminal 16P of battery cell 11a in battery cell unit 21C by welding. Eighth plate portion 232 is placed on fourth plate portion 233 in the Y axis direction. Fourth plate portion 233 and eighth plate portion 232 are in surface contact with each other in a plane parallel to the X-Z-axes plane. Fourth plate portion 233 and eighth plate portion 232 are joined to each other by welding.

In first bus bar 51 having such a configuration, first base portion 226 is constituted of first plate portion 227, second plate portion 228, and third plate portion 229. First plate portion 227 of first base portion 226 is connected to negative electrode terminal 16N of battery cell 11d in battery cell unit 21B. Second base portion 221 is constituted of fifth plate portion 222, sixth plate portion 223, and seventh plate portion 224. Fifth plate portion 222 of second base portion 221 is connected to positive electrode terminal 16P of battery cell 11a in battery cell unit 21C.

Rising portion 231 is constituted of a portion at which fourth plate portion 233 and eighth plate portion 232 are placed on each other. Rising portion 231 has a shape to rise from third plate portion 229 of first base portion 226 and seventh plate portion 224 of second base portion 221 in the +Z axis direction.

Rising portion 231 rises from third plate portion 229 of first base portion 226 and seventh plate portion 224 of second base portion 221 in the axis direction orthogonal to the X-Y-axes plane in which third plate portion 229 and seventh plate portion 224 are disposed. Rising portion 231 rises from first base portion 226 and second base portion 221 in a direction further away from battery cells 11, 11 to which first base portion 226 and second base portion 221 are connected. Rising portion 231 is provided at a position separated in the +Z axis direction from third side surface 15 of exterior package 12 on which electrode terminal 16 is provided.

The Z axis direction in which rising portion 231 rises from first base portion 226 (third plate portion 229) and second base portion 221 (seventh plate portion 224) corresponds to the rising direction of rising portion 231. The Y axis direction in which fourth plate portion 233 and eighth plate portion 232 are placed on each other corresponds to the thickness direction of rising portion 231. The X axis direction orthogonal to the rising direction of rising portion 231 and the thickness direction of rising portion 231 corresponds to the width direction of rising portion 231.

Rising portion 231 is provided with a fragile portion 240. Fragile portion 240 is provided in a root region 236 of rising portion 231. Fragile portion 240 has a rigidity smaller than those of the other portions of rising portion 231 except for fragile portion 240. Fragile portion 240 has a rigidity smaller than that of a tip region 237 of rising portion 231.

As shown in FIG. 8, root region 236 of rising portion 231 is defined on the root side of rising portion 231 having the shape to rise from first base portion 226 and second base portion 221. Tip region 237 of rising portion 231 is defined on the tip side of rising portion 231 having the shape to rise from first base portion 226 and second base portion 221.

More specifically, rising portion 231 has a root portion 231j and a tip portion 231k, and extends between root portion 231j and tip portion 231k. Root portion 231j is located on the first base portion 226 and second base portion 221 side in the rising direction (Z axis direction) of rising portion 231, and tip portion 231k is located opposite to root portion 231j. Root region 236 of rising portion 231 corresponds to a region close to root portion 231j with respect to tip portion 231k in the rising direction of rising portion 231. Tip region 237 of rising portion 231 corresponds to a region close to tip portion 231k with respect to root portion 231j in the rising direction of rising portion 231.

Rising portion 231 has a rising length La. In this case, root region 236 of rising portion 231 has a length range of La/2 from root portion 231j in the +Z axis direction. Tip region 237 of rising portion 231 has a length range of La/2 from tip portion 231k in the –Z axis direction.

Fragile portion 240 is provided at a position separated from root portion 231j in the +Z axis direction. Fragile portion 240 is provided at a position separated from tip region 237 of rising portion 231 in the –Z axis direction.

Fragile portion 240 is constituted of a thin structure 241 in which the thickness of rising portion 231 is locally small. Rising portion 231 has a thickness Tb in the Y axis direction at a position other than fragile portion 240. Fragile portion 240 has a thickness Ta smaller than thickness Tb in the Y axis direction (Ta<Tb). Groove portions 242 are formed in root region 236 of rising portion 231. Groove portions 242 have such shapes of grooves that are respectively recessed from the surface of fourth plate portion 233 oriented in the –Y axis direction and the surface of eighth plate portion 232 oriented in the +Y axis direction and extend in the +X axis direction. Thin structure 241 is constituted of groove portions 242.

The thickness direction of rising portion 231 at fragile portion 240 is parallel to the Y axis direction in which the restraint force by restraint member 41 is applied to the plurality of battery cells 11.

Fragile portion 240 is provided at a position overlapping with the X-Z-axes plane (predetermined plane) that constitutes the boundary between battery cell 11d in battery cell unit 21B and battery cell 11a in battery cell unit 21C. First bus bar 51 has a symmetrical shape with respect to the X-Z-axes plane that constitutes the boundary between battery cell 11*d* in battery cell unit 21B and battery cell 11*a* in battery cell unit 21C.

Figure 9:
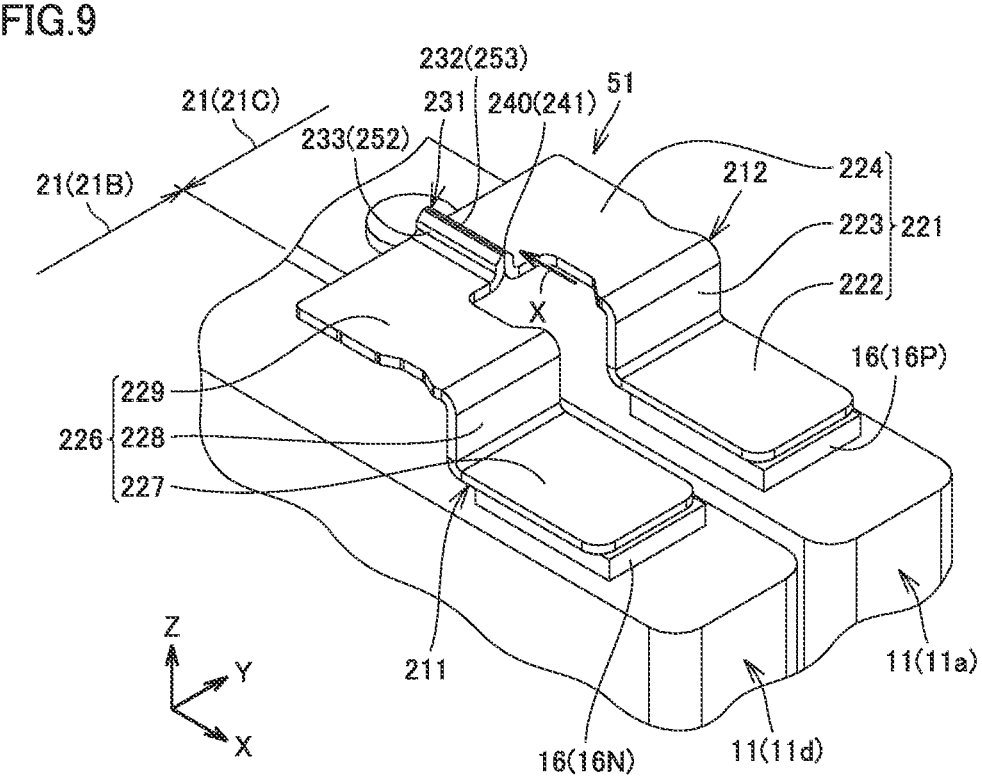
FIG. 9 is a perspective view showing a first form change of the connection structure for the battery cells in FIG. 6.
Figures 10, 11:
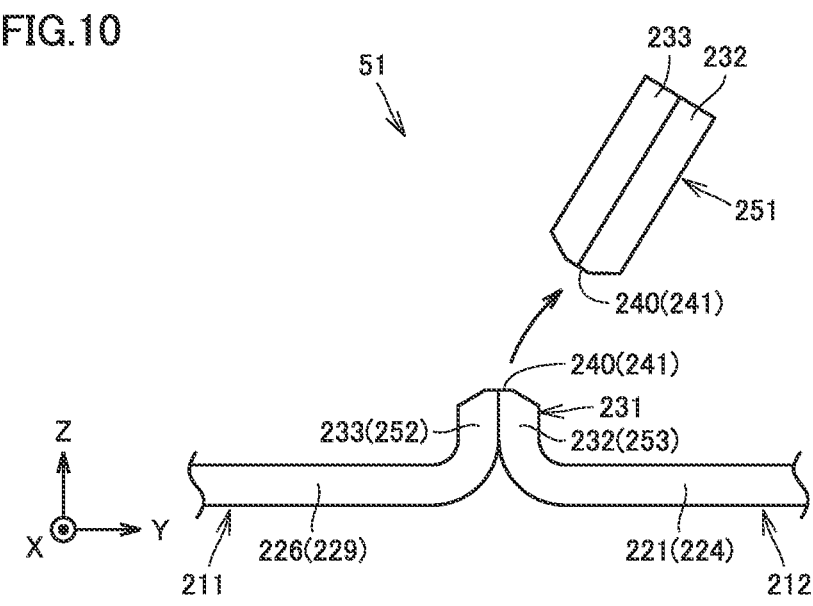
FIG. 10 is a diagram showing the connection structure for the battery cells when viewed in a direction indicated by an arrow X in FIG. 9.
FIG. 11 is a perspective view showing a second form change of the connection structure for the battery cells in FIG. 6.

FIG. 9 is a perspective view showing a first form change of the connection structure for the battery cells in FIG. 6. FIG. 10 is a diagram showing the connection structure for the battery cells when viewed in a direction indicated by an arrow X in FIG. 9. FIG. 11 is a perspective view showing a second form change of the connection structure for the battery cells in FIG. 6.

Referring to FIGS. 6 and 8 to 11, rising portion 231 has a dividable portion 251, a first remaining portion 252, and a second remaining portion 253.

Dividable portion 251 connects between first base portion 226 and second base portion 221. Dividable portion 251 is dividable from first base portion 226 and second base portion 221 with fragile portion 240 serving as a boundary. In a state in which dividable portion 251 is divided from first base portion 226 and second base portion 221, first remaining portion 252 remains on the first base portion 226 side, and second remaining portion 253 remains on the second base portion 221 side. First remaining portion 252 and second remaining portion 253 are placed on each other.

Dividable portion 251 is connected to first remaining portion 252 and second remaining portion 253 at fragile portion 240. Dividable portion 251 is constituted of: fourth plate portion 233 located on the tip side of rising portion 231 with respect to fragile portion 240; and eighth plate portion 232 located on the tip side of rising portion 231 with respect to fragile portion 240. Fourth plate portion 233 and eighth plate portion 232 are joined to each other at dividable portion 251.

First remaining portion 252 is constituted of fourth plate portion 233 located on the root side of rising portion 231 with respect to fragile portion 240. Second remaining portion 253 is constituted of eighth plate portion 232 located on the root side of rising portion 231 with respect to fragile portion 240. Fourth plate portion 233 and eighth plate portion 232 are not joined to each other at first remaining portion 252 and second remaining portion 253.

Battery module 100 may be disassembled for maintenance or the like. In such a case, an operator holds dividable portion 251 of rising portion 231 using a tool such as pliers and applies force along the Y axis direction to rising portion 231, thereby breaking fragile portion 240. Thus, the connection made between first base portion 226 and second base portion 221 by rising portion 231 can be disconnected, thereby separating adjacent battery cell units 21. For example, as shown in FIG. 11, the operator separates battery cell unit 21C from battery cell units 21B, 21D located beside battery cell unit 21C so as to repair a component of battery cell unit 21C or replace a battery cell 11 in battery cell unit 21C.

In the present embodiment, fragile portion 240 is provided in root region 236 of rising portion 231. With such a configuration, the operator can readily hold rising portion 231 using pliers or the like or can readily apply force to fragile portion 240, with the result that breaking fragile portion 240 can be readily broken. Thus, workability at the time of disassembling battery module 100 can be improved.

Further, in fragile portion 240 constituted of thin structure 241, the thickness direction of rising portion 231 in fragile portion 240 is parallel to the Y axis direction in which the plurality of battery cells 11 (battery cell units 21) are stacked. In this case, the restraint force in the Y axis direction is applied from restraint member 41 to the plurality of battery cells 11 (battery cell units 21), so that battery cells 11 can be suppressed from leaning in the Y axis direction when the operator applies force along the Y axis direction to rising portion 231 in order to break fragile portion 240. Thus, the force applied to rising portion 231 can be more efficiently transmitted to fragile portion 240, thereby improving workability at the time of breaking fragile portion 240 by the operator.

Further, fragile portion 240 is disposed to overlap with the X-Z-axes plane that constitutes a boundary between battery cells 11, 11 connected by first bus bar 51, and first bus bar 51 has a symmetrical shape with respect to the X-Z-axes plane. With such a configuration, first bus bar 51 is supported by battery cell 11 in a balanced manner between the first base portion 226 side connected to first battery cell 11*d* and the second base portion 221 side connected to second battery cell 11*a* with fragile portion 240, to which the force from the operator is transmitted, being interposed therebetween. Therefore, when the operator applies force along the Y axis direction to rising portion 231 in order to break fragile portion 240, first bus bar 51 can be suppressed from being elastically deformed. Thus, the force applied to rising portion 231 can be more efficiently transmitted to fragile portion 240, thereby improving workability at the time of breaking fragile portion 240 by the operator.

Further, rising portion 231 has dividable portion 251 that is dividable from first base portion 226 and second base portion 221 with fragile portion 240 serving as a boundary. With such a configuration, the operator can continuously apply force to rising portion 231 while holding dividable portion 251 until fragile portion 240 becomes broken, thereby improving workability at the time of breaking fragile portion 240 by the operator.

Further, rising portion 231 further has first remaining portion 252 and second remaining portion 253 shown in FIGS. 9 and 10. With such a configuration, when assembling, to battery module 100, a battery cell unit 21 having been through maintenance, connection between first base portion 226 and second base portion 221 of first bus bar 51 can be made again by performing welding onto first remaining portion 252 and second remaining portion 253.

Figures 12, 13:
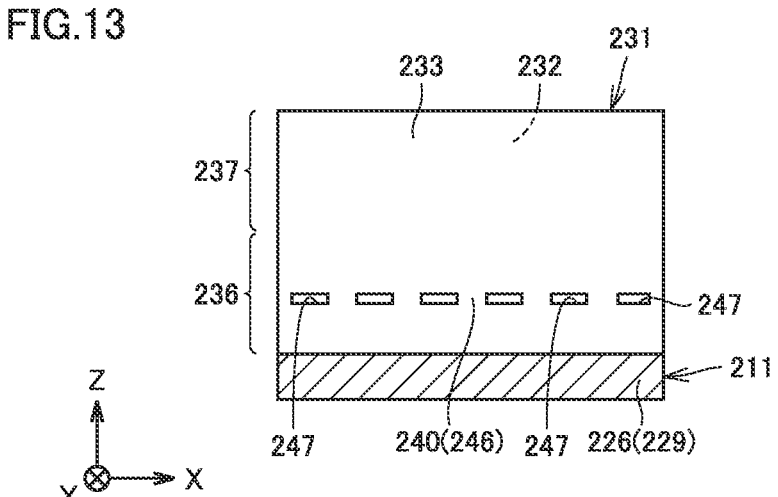
FIG. 12 is a diagram showing a first modification of a fragile portion in FIG. 8.
FIG. 13 is a diagram showing a second modification of the fragile portion in FIG. 8.

FIG. 12 is a diagram showing a first modification of the fragile portion in FIG. 8. Referring to FIG. 12, in the present modification, fragile portion 240 is constituted of a notched structure 243. Notches 244 are provided in root region 236 of rising portion 231.

Notches 244 are provided to notch rising portion 231 in the width direction (X axis direction) of rising portion 231 orthogonal to the rising direction (Z axis direction) of rising portion 231 and the thickness direction (Y axis direction) of rising portion 231. Notches 244 have such shapes of notches that are recessed from the respective side surfaces of rising portion 231 oriented in the +X axis direction and the −X axis direction and extend through rising portion 231 in the Y axis direction. A width Sa of rising portion 231 at fragile portion 240 is smaller than a width Sb of rising portion 231 at a position other than fragile portion 240 (Sa<Sb).

FIG. 13 is a diagram showing a second modification of the fragile portion in FIG. 8. Referring to FIG. 13, in the present modification, fragile portion 240 is constituted of a perforated structure 246. Cut portions 247 are provided in root region 236 of rising portion 231.

Each of cut portions 247 is constituted of a through hole extending through rising portion 231 in the thickness direction of rising portion 231. Cut portions 247 are provided intermittently in the form of a line. Cut portions 247 extend in the form of a straight line. Cut portions 247 extend in the X axis direction.

Figures 14, 15:
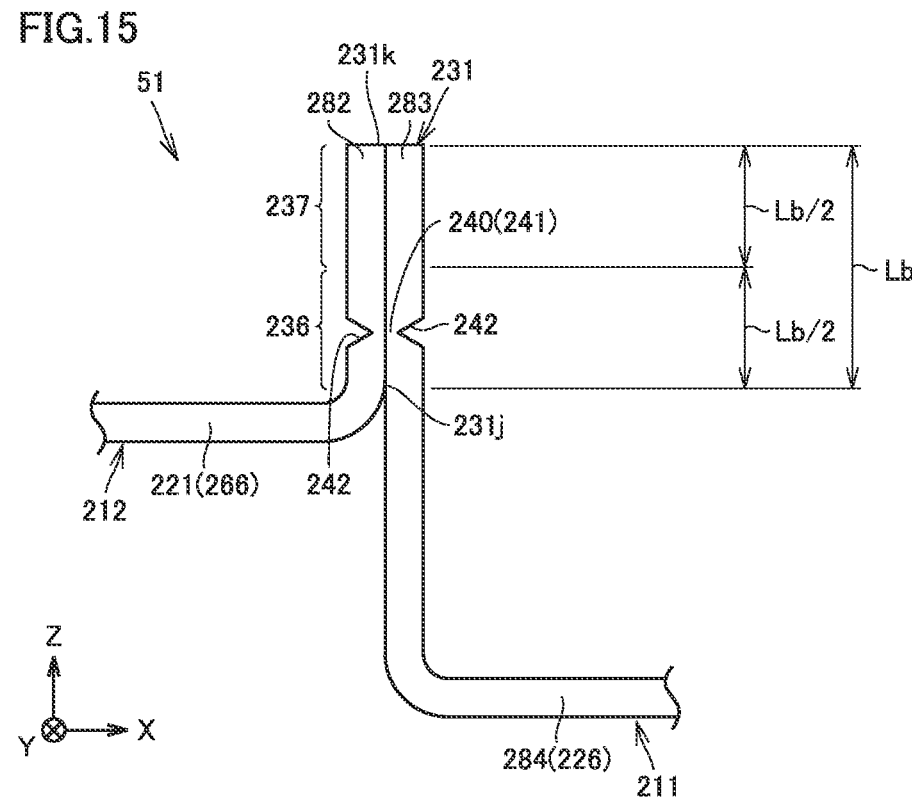
FIG. 14 is a perspective view showing a modification of a first bus bar in FIG. 6.
FIG. 15 is a diagram showing the first bus bar when viewed in a direction indicated by an arrow XV in FIG. 14.

FIG. 14 is a perspective view showing a modification of a first bus bar in FIG. 6. FIG. 15 is a diagram showing a first bus bar when viewed in a direction indicated by an arrow XV in FIG. 14.

Referring to FIGS. 14 and 15, in the present modification, first bus-bar-divided body 211 is provided at a position overlapping with battery cell 11*d* in battery cell unit 21B when viewed in the Z axis direction. First bus-bar-divided body 211 has a first plate portion 284 and a second plate portion 283.

First plate portion 284 has a plate shape having a thickness direction corresponding to the Z axis direction, and is disposed in parallel with the X-Y-axes plane. First plate portion 284 is placed on negative electrode terminal 16N of battery cell 11*d* in battery cell unit 21B in the Z axis direction. First plate portion 284 is joined to negative electrode terminal 16N of battery cell 11*d* in battery cell unit 21B by welding. Second plate portion 283 has a plate shape having a thickness direction corresponding to the X axis direction, and is disposed in parallel with the Y-Z-axes plane. Second plate portion 283 extends in the +Z axis direction from the end portion of first plate portion 284 in the −X axis direction.

When viewed in the Z axis direction, second bus-bar-divided body 212 is provided to extend over a position overlapping with battery cell 11*a* in battery cell unit 21C and a position overlapping with battery cell 11*d* in battery cell unit 21B. Second bus-bar-divided body 212 has a third plate portion 262, a fourth plate portion 263, a fifth plate portion 264, an elastic portion 265, a sixth plate portion 266, and a seventh plate portion 282.

Third plate portion 262 has a plate shape having a thickness direction corresponding to the Z axis direction, and is disposed in parallel with the X-Y-axes plane. Third plate portion 262 is placed on positive electrode terminal 16P of battery cell 11*a* in battery cell unit 21C in the Z axis direction. Third plate portion 262 is joined to positive electrode terminal 16P of battery cell 11*a* in battery cell unit 21C by welding. Fourth plate portion 263 has a plate shape having a thickness direction corresponding to the X axis direction, and is disposed in parallel with the Y-Z-axes plane. Fourth plate portion 263 extends in the +Z axis direction from the end portion of third plate portion 262 in the −X axis direction.

Each of fifth plate portion 264 and sixth plate portion 266 has a plate shape having a thickness direction corresponding to the Z axis direction, and is disposed in parallel with the X-Y-axes plane. Fifth plate portion 264 extends in the −X axis direction from the end portion of fourth plate portion 263 in the +Z axis direction. Sixth plate portion 266 is provided at a position displaced from fifth plate portion 264 in the −Y axis direction. Fifth plate portion 264 is provided at a position overlapping with battery cell 11*a* in battery cell unit 21C when viewed in the Z axis direction, and sixth plate portion 266 is provided at a position overlapping with battery cell 11*d* in battery cell unit 21B when viewed in the Z axis direction.

Elastic portion 265 extends between fifth plate portion 264 and sixth plate portion 266. When viewed in the Z axis direction, elastic portion 265 is provided at a position overlapping with the boundary between battery cell 11*a* in battery cell unit 21C and battery cell 11*d* in battery cell unit 21B. Elastic portion 265 extends in the −Z axis direction from the end portion of fifth plate portion 264 in the −Y axis direction, is curved to reverse in the Z axis direction, and further extends in the +Z axis direction so as to be contiguous to the end portion of sixth plate portion 266 in the +Y axis direction. Elastic portion 265 can be elastically deformed to change a distance between fifth plate portion 264 and sixth plate portion 266 in the Y axis direction.

Seventh plate portion 282 has a plate shape having a thickness direction corresponding to the X axis direction, and is disposed in parallel with the Y-Z-axes plane. Seventh plate portion 282 extends in the +Z axis direction front an end portion of sixth plate portion 266 in the +X axis direction. Seventh plate portion 282 is placed on second plate portion 283 in the X axis direction. Seventh plate portion 282 is in surface contact with second plate portion 283 in a plane parallel to the Y-Z-axes plane. Second plate portion 283 and seventh plate portion 282 are joined to each other by welding.

In first bus bar 51 having such a configuration, first base portion 226 is constituted of first plate portion 284. First plate portion 284 of first base portion 226 is connected to negative electrode terminal 16N of battery cell 11*d* in battery cell unit 21B. Second base 221 is constituted of third plate portion 262, fourth plate portion 263, fifth plate portion 264, elastic portion 265, and sixth plate portion 266. Third plate portion 262 of second base portion 221 is connected to positive electrode terminal 16P of battery cell 11*a* in battery cell unit 21C.

Rising portion 231 is constituted of a portion at which second plate portion 283 and seventh plate portion 282 are placed on each other. Rising portion 231 is a portion on the positive side in the Z axis direction with respect to the corner portions of sixth plate portion 266 and seventh plate portion 282.

Fragile portion 240 is provided in root region 236 of rising portion 231. Rising portion 231 has a rising length Lb. Root region 236 of rising portion 231 has a length range of Lb/2 from root portion 231*j* of rising portion 231 in the −Z axis direction. Tip region 237 of rising portion 231 has a length range of Lb/2 from tip portion 231*k* of rising portion 231 in the −Z axis direction.

The thickness direction of rising portion 231 in fragile portion 240 is the X axis direction orthogonal to the Y axis direction in which the restraint force by restraint member 41 is applied to the plurality of battery cells 11. First bus bar 51 has an asymmetrical shape with respect to the X-Z-axes plane that constitutes the boundary between battery cell 11*d* in battery cell unit 21B and battery cell 11*a* in battery cell unit 21C.

The above-described structure of battery module 100 according to the embodiment of the present invention is summarized as follows: battery module 100 according to the present embodiment includes: the plurality of battery cells 11 stacked in the Y axis direction serving as the predetermined direction; and the plurality of bus bars 50 that electrically connect the plurality of battery cells 11 together. The plurality of bus bars 50 include first bus bar 51 extending between first batten cell 11*d* and second battery cell 11*a* of the plurality of battery cells 11, first battery cell 11*d* and second battery cell 11*a* being adjacent to each other in the Y axis direction. First bus bar 51 has first base portion 226 connected to first battery cell 11*d*, second base portion 221 connected to second battery cell 11*a*, and rising portion 231 that has a shape to rise from first base portion 226 and second base portion 221 and that connects between first base portion 226 and second base portion 221. Fragile portion 240 is provided in root region 236 of rising portion 231.

According to battery module 100 of the embodiment of the present invention thus configured, since fragile portion 240 is provided in root region 236 of rising portion 231, the operator can readily break fragile portion 240 to separate first battery cell 11*d* and second battery cell 11*a* adjacent to each other in the predetermined direction. Thus, workability at the time of disassembling battery module 100 can be improved.

It should be noted that in addition to first bus bar 51, the fragile portion of the present invention may be also provided in second bus bar 52 that connects between battery cells 11, 11 in battery cell unit 21.

Although the embodiments of the present invention have been described and illustrated in detail, it is clearly understood that the same is by way of illustration and example only and is not to be taken by way of limitation, the scope of the present invention being interpreted by the terms of the appended claims. The scope of the present invention is defined by the terms of the claims, and is intended to include any modifications within the scope and meaning equivalent to the terms of the claims.

What is claimed is:

1. A battery module comprising:

a plurality of battery cells stacked in a predetermined direction; and a plurality of bus bars that electrically connect the plurality of battery cells together, wherein the plurality of bus bars include a first bus bar extending between a first battery cell and a second battery cell of the plurality of battery cells, the first battery cell and the second battery cell being adjacent to each other in the predetermined direction, the first bus bar has a first base portion connected to the first battery cell, a second base portion connected to the second battery cell, and a rising portion that has a shape to rise from the first base portion and the second base portion in a rising direction orthogonal to the predetermined direction and that connects between the first base portion and the second base portion, and a fragile portion is provided in a root region of the rising portion, the fragile portion is constituted of a first structure, a second structure or a third structure, the first structure being a structure in which a groove portion is provided to recess in a thickness direction of the rising portion, the second structure being a structure in which a notch is provided in a width direction of the rising portion, a length of the fragile portion in the width direction of the rising portion being shorter than a length of the first base portion in the width direction of the rising portion, the width direction of the rising portion being orthogonal to the rising direction of the rising portion and the thickness direction of the rising portion and the third structure being a structure in which cut portions each extending through the rising portion in the thickness direction of the rising portion are intermittently provided in a form of a line, the rising portion includes a dividable portion that connects between the first base portion and the second base portion and that is dividable from the first base portion and the second base portion with the fragile portion serving as a boundary, and a first remaining portion and a second remaining portion, the first remaining portion remaining on the first base portion side in a state in which the dividable portion is divided from the first base portion and the second base portion, the second remaining portion remaining on the second base portion side and being placed on the first remaining portion in the state in which the dividable portion is divided from the first base portion and the second base portion, a length of the dividable portion in the rising direction is longer than a length of the first remaining portion in the rising direction, and the length of the dividable portion in the rising direction is longer than a length of the second remaining portion in the rising direction.

2. The battery module according to claim 1, wherein restraint force along the predetermined direction is applied to the plurality of battery cells, and a thickness direction of the rising portion at the fragile portion is parallel to the predetermined direction.

3. The battery module according to claim 1, wherein the fragile portion is provided to overlap with a predetermined plane that constitutes a boundary between the first battery cell and the second battery cell, and the first bus bar has a symmetrical shape with respect to the predetermined plane.

4. The battery module according to claim 1, wherein the rising portion includes a dividable portion that connects between the first base portion and the second base portion and that is dividable from the first base portion and the second base portion with the fragile portion serving as a boundary.

5. The battery module according to claim 4, wherein the rising portion further includes a first remaining portion and a second remaining portion, the first remaining portion remaining on the first base portion side in a state in which the dividable portion is divided from the first base portion and the second base portion, the second remaining portion remaining on the second base portion side and being placed on the first remaining portion in the state in which the dividable portion is divided from the first base portion and the second base portion.

6. The battery module according to claim 1, comprising a plurality of battery cell units arranged side by side in the predetermined direction and fed with restraint force along the predetermined direction, wherein each of the battery cell units has the plurality of battery cells arranged side by side continuously in the predetermined direction, and a holding member that collectively holds the plurality of battery cells arranged side by side continuously in the predetermined direction, the first bus bar electrically connects between battery cells adjacent to each other in the predetermined direction between a first battery cell unit of the plurality of battery cell units and a second battery cell unit of the plurality of battery cell units, the second battery cell unit being adjacent to the first battery cell unit in the predetermined direction, and the plurality of bus bars further include a second bus bar that electrically connects between battery cells adjacent to each other in the predetermined direction in each of the battery cell units.

7. The battery module according to claim 1 wherein each of the battery cells has an output density of 8000 W/L or more.

* * * * *